(12) United States Patent
McNulty (10) Patent No.: US 8,596,317 B1
(45) Date of Patent: Dec. 3, 2013

(54) PORTABLE UTILITY BLANKET FOR USE IN THE CARGO AREA OF A VEHICLE

(76) Inventor: Lam P. McNulty, Hoover, AL (US)

(*) Notice: Subject to any disclaimer, the term of this patent is extended or adjusted under 35 U.S.C. 154(b) by 204 days.

(21) Appl. No.: 13/098,001

(22) Filed: Apr. 29, 2011

(51) Int. Cl.
*B60N 3/04* (2006.01)

(52) U.S. Cl.
USPC ........ 150/154; 224/579; 224/160; 296/97.23; 296/39.1; 428/67; 428/76; D12/203; D12/401

(58) Field of Classification Search
USPC .............. 150/154; 383/4, 6; 297/129, 188.06, 297/228.1, 228.12; 296/190.03, 24.31, 296/26.02, 37.13, 37.5, 37.6, 39.1, 65.03, 296/681, 69, 97.22, 97.23; 428/76, 67, 95
See application file for complete search history.

(56) References Cited

U.S. PATENT DOCUMENTS

| | | | | |
|---|---|---|---|---|
| 4,693,511 | A | * | 9/1987 | Seltzer et al. ............... 297/228.1 |
| 4,829,627 | A | * | 5/1989 | Altus et al. ............... 16/4 |
| 4,848,826 | A | | 7/1989 | Kuwabara et al. |
| 4,968,548 | A | * | 11/1990 | Gibson et al. ............... 428/95 |
| 4,979,772 | A | * | 12/1990 | Carey et al. ............... 296/39.1 |
| 4,991,245 | A | * | 2/1991 | Franco ............... 5/419 |
| 5,243,724 | A | * | 9/1993 | Barnes ............... 5/482 |
| 5,322,335 | A | | 6/1994 | Niemi |
| 5,547,187 | A | | 8/1996 | Spykerman |
| 5,830,560 | A | | 11/1998 | Koa |
| 5,887,301 | A | * | 3/1999 | Anderson ............... 5/482 |
| 6,017,074 | A | | 1/2000 | Biskup |
| 6,794,013 | B1 | | 9/2004 | Iacovelli et al. |
| 7,261,361 | B1 | | 8/2007 | Simons |
| 2008/0185866 | A1 | | 8/2008 | Tarrant et al. |

FOREIGN PATENT DOCUMENTS

| | | |
|---|---|---|
| JP | 2010100160 A | 5/2010 |
| WO | 2008129340 A1 | 10/2008 |

OTHER PUBLICATIONS http://www.hatchbag.com/ 4 pages from website dated Sep. 23, 2010 and directed to SUV Cargo Liners.
http://www.sportomotoring.com/cargo-protection.html 3 pages from website dated Sep. 23, 2010 and directed to SUV Cargo Liners.

* cited by examiner

*Primary Examiner* — Anthony Stashick
*Assistant Examiner* — Cynthia Collado
(74) *Attorney, Agent, or Firm* — Kenneth M. Bush; Bush Intellectual Property Law (57) ABSTRACT

A utility blanket is disclosed herein. In various aspects, the utility blanket includes a fabric layer. A strip that includes hook fastener material is located about the fabric layer, and the hook fastener material is adapted to engage removeably the fabric covering of a vehicle, in various aspects. A cover that is positionable between at least an engaged position and a disengaged position is located about the fabric layer, in various aspects, and a complementary strip comprised of loop material is located about the cover. With the cover positioned in the engaged position, the complementary strip engages the strip to secure the cover over the strip, and, with the cover positioned in the disengaged position, the strip is exposed, in various aspects. This Abstract is presented to meet the requirements of 37 C.F.R. §1.72(b) only. This Abstract is not intended to identify key elements of the apparatus disclosed herein or to delineate the scope thereof.

5 Claims, 6 Drawing Sheets

PORTABLE UTILITY BLANKET FOR USE IN THE CARGO AREA OF A VEHICLE

FIELD OF THE INVENTION

The present disclosure relates to a portable utility blanket for use in the cargo area of a vehicle, and more particularly, to a portable utility blanket and associated methods for use in the loading, transportation, and unloading of cargo from the cargo area of the vehicle.

BACKGROUND OF THE INVENTION

Various vehicles such as vans, sport utility vehicles, station wagons, as well as boats and aircraft may have a compartment that may be used to transport cargo. The compartment may be configured in various ways by placing seats into a collapsed position, removal of seats, repositioning of seats, and so forth. The compartment including backs of collapsed seats may be generally lined with a fabric covering that may be in the form of carpeting, felt, or other such textile material. All sorts of cargo may be placed in the compartment or otherwise placed about portions of the vehicle having a fabric covering. The cargo may damage the fabric covering, the portions of the vehicle that lack the fabric covering may rub against the cargo thereby damaging the cargo, or the fabric covering may be abrasive and may damage the cargo. Various devices have been developed to cover the fabric covering to protect the fabric covering from being damaged by the cargo or to protect the cargo from damage by rubbing or chaffing against portions of the vehicle.

However, there remains a need for improved apparatus that can facilitate the loading of cargo onto the vehicle or the unloading of cargo from the vehicle and that may be secured to the vehicle to protect the fabric covering, other portions of the vehicle, as well as protect the cargo.

SUMMARY OF THE INVENTION

These and other needs and disadvantages may be overcome by the apparatus disclosed herein. Additional improvements and advantages may be recognized by those of ordinary skill in the art upon study of the present disclosure.

A utility blanket is disclosed herein. In various aspects, the utility blanket includes a fabric layer. A strip that includes hook fastener material is located about the fabric layer, and the hook fastener material is adapted to engage removeably the fabric covering of a vehicle, in various aspects. A cover that is positionable between at least an engaged position and a disengaged position is located about the fabric layer, in various aspects, and a complementary strip comprised of loop material is located about the cover. With the cover positioned in the engaged position, the complementary strip engages the strip to secure the cover over the strip, and with the cover positioned in the disengaged position the strip is exposed, in various aspects.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

A utility blanket is disclosed herein. In various aspects, the utility blanket includes a fabric layer. A strip of hook fastener material may be attached to the fabric layer, and the hook fastener material may be formed to removeably engage the fabric covering of a vehicle, such as the fabric covering generally found within the cargo area of a van, sport utility vehicle, station wagon, and so forth. In various aspects, the utility blanket includes a cover and the cover includes a complementary strip of loop material. The cover may be positioned between an engaged position and a disengaged position to cover or uncover the strip of loop fastener material, respectively.

With the cover positioned in the engaged position, the complementary strip of loop material engages the hook fastener material of the strip to secure removeably the cover to the strip. With the cover removeably secured to the strip, the cover covers the strip of hook fastener material so that the strip of hook fastener material, and, thus, the fabric layer to which the strip is attached, may be slid or otherwise moved about the fabric covering of the vehicle without engaging the fabric covering of the vehicle. With the cover positioned in the disengaged position, the hook fastener material of the strip is exposed to allow the hook fastener material of the strip to be secured removeably to the fabric covering of the vehicle, thereby securing the fabric layer to the fabric covering of the vehicle.

Cargo may be placed upon the fabric layer of the utility blanket. One or more handles may be located generally about the perimeter of the fabric layer of the utility blanket. A user may manipulate the fabric layer and any cargo placed upon the fabric layer of the utility blanket by the one or more handles, for example, in order to position the utility blanket about the vehicle, to place the utility blanket on board the vehicle, to unload the utility blanket from the vehicle, or to carry the utility blanket to or from the vehicle.

Figure 1A:
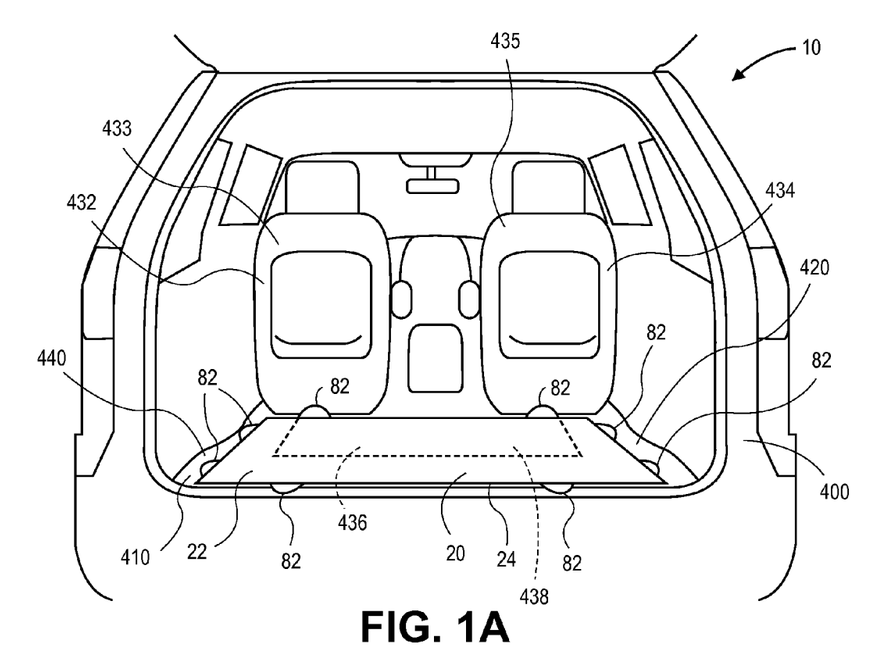
FIG. 1A illustrates by front perspective view an implementation of a utility blanket positioned about a vehicle.

FIG. 1A illustrates an implementation of the utility blanket 10 placed within vehicle 400. Utility blanket 10, as illustrated, includes fabric layer 20 with sides 22, 24 and handles 82, which are located generally about the perimeter of fabric layer 20. Handles 82 may be located generally proximate the corners of fabric layer 20. A user may grasp utility blanket 10 by handle(s) 82 to load utility blanket 10 onto vehicle 400, position utility blanket 10 within vehicle 400, or unload utility blanket 10 from vehicle 400. With cargo placed upon side 22 of fabric layer 20 of utility blanket 10, the user may grasp the handle(s) 82 and slide the fabric layer 20 upon cargo bay floor 410 of vehicle 400 to load the utility blanket 10 into vehicle 400, to position the utility blanket within the vehicle 400, or to unload utility blanket 10 from vehicle 400.

As illustrated in FIG. 1A, utility blanket 10 is placed upon cargo bay floor 410 of vehicle 400 such that side 24 of utility blanket 10 is biased against cargo bay floor 410. In other implementations, utility blanket 10 may be otherwise placed in or about vehicle 400. Vehicle 400 may be a truck, sport utility vehicle, car, station wagon, other wheeled vehicle, an aircraft, a boat, and so forth, in various implementations. As illustrated, seats 432 and 434, which form a second row of seating in vehicle 400, are positioned in the upright position. Seat 436, which is illustrated in phantom, forms a third row of seating in vehicle 400. Seat 436 of vehicle 400 is positioned in a folded position, as illustrated, to expand the area of cargo bay floor 410, so that portions of cargo bay floor 410 are defined by the seat back 438 of seat 436 in the folded position. At least portions of the cargo bay floor 410 including seat back 438 of seat 436 may be generally covered with a fabric covering 440 that may be generally formed, for example, of a carpeting, piled fabric material, felt, other woven material, or other material having loop material characteristics such that the fabric covering 440 may engage with or disengage from a hook fastener material 32 (see FIG. 2A). The fabric covering 440 may be made from wool or from a manmade fiber such as polypropylene, and may include twisted tufts, in various implementations.

Utility blanket 10 may include one or more strips 30 formed of a hook fastener material 32 (see FIG. 2A) secured to side 24 of fabric layer 20, and fabric layer 20 may be secured to fabric covering 440 of cargo bay floor 410 by engagement of the hook fastener material 32 with fabric covering 440 thereby securing utility blanket 10 to fabric covering 440 and, thus, securing utility blanket 10 to vehicle 400. Utility blanket 10 may be disengaged from vehicle 400 by disengagement of hook fastener material 32 of strip 30 from the fabric covering 440. In other implementations (see FIGS. 4C, 4D) portions of the utility blanket 10 may be secured to seat back(s) of seat(s) in the upright position by engagement of the hook fastener material 32 with the fabric covering 440 of the seat back(s), such as seat backs 433, 435 of seats 432, 434, respectively, to protect the seat backs 433, 435, other portions of the seats, or both.

Figures 1B, 1C:
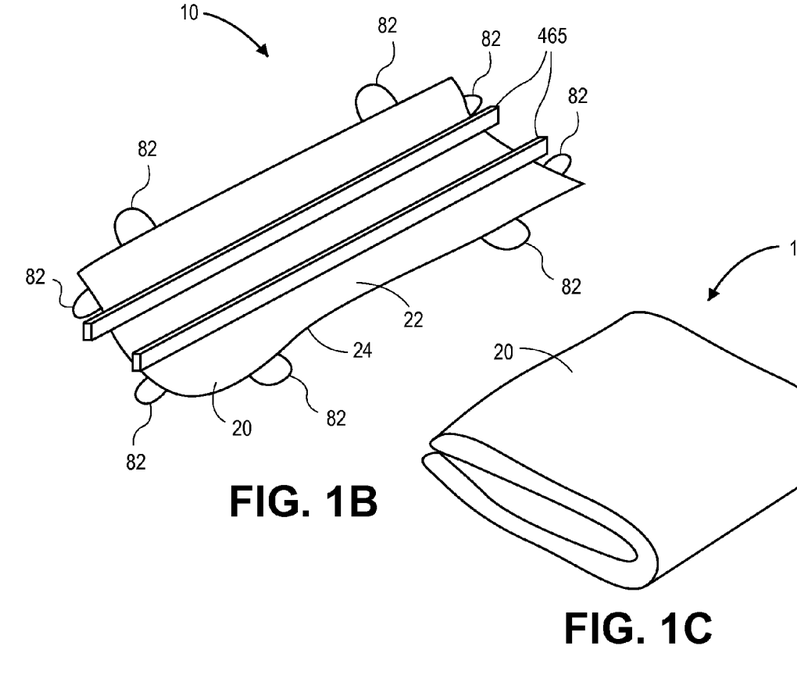
FIG. 1B illustrates by front perspective view the implementation of the utility blanket of FIG. 1A removed from the vehicle and with cargo placed thereupon.
FIG. 1C illustrates by front perspective view the implementation of the utility blanket of FIG. 1A in a folded position for storage.

FIG. 1B illustrates cargo 465 placed upon side 22 of fabric layer 20 of utility blanket 10. One or more users may carry the utility blanket 10 with cargo 465 placed thereupon by handle (s) 82 by one or more users. FIG. 1C illustrates utility blanket 10 folded for storage. The utility blanket 10 including fabric layer 20 may be generally made of various fabrics, textiles, sheet(s) of material, combinations thereof, or suchlike that are generally compliant such that utility blanket 10 including fabric layer 20 may be folded, rolled up, or otherwise condensed for storage.

Figure 2A:
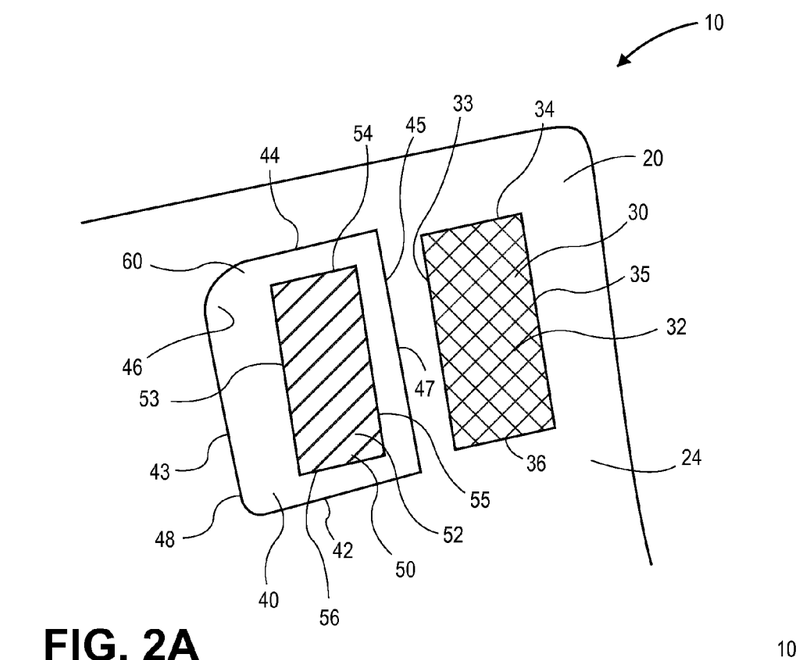
FIG. 2A illustrates by frontal view portions of the implementation of the utility blanket of FIG. 1A including the cover in a disengaged position.

FIG. 2A illustrates a portion of utility blanket 10 including strip 30 formed to include hook fastener material 32. Utility blanket, in this implementation, includes cover 40, and cover 40 includes complementary strip 50 formed to include loop material 52. Strip 30 is secured to side 24 of fabric layer 20 of utility blanket 10, and strip 30 is generally rectangular, in this implementation, but may have other shapes in other implementations. Strip 30 may be formed of fabric or other generally compliant material, in various implementations, and strip 30 may be secured to side 24 of fabric layer 20, for example, by stitching, adhesive, rivets or other fasteners, combinations thereof, or in other ways or combinations of ways. Hook fastener material 32 may be formed into strip 30 such that hook fastener material 32 is unitary with strip 30, or hook fastener material 32 may be secured to strip 30 or otherwise formed onto strip 30 in various ways in various implementations. In some implementations, strip 30 may be unitary with fabric layer 20 and may be formed, for example, by integration of hook fastener material 32 with fabric layer 20.

As illustrated in FIG. 2A, cover 40 is generally rectangular in shape with edges 42, 43, 44, 45 to match the shape of strip 30, but cover 40 and corresponding strip 30 may have other shapes in other implementations. Edge 45 of cover 40 is hingedly secured to side 24 of fabric layer 20 of utility blanket 10 by attachment 47 along edge 45. Attachment 47 may be formed for example, by stitching, adhesive, rivets or other fasteners, combinations thereof, or in other ways or combinations of ways. Edges 42, 43, 44 are unattached and attachment 47 is formed so that cover 40 may be hingedly positioned about attachment 47 of side 45. As illustrated in FIG. 2A, cover 40 is positioned in a disengaged position 60 such that cover 40 does not cover strip 30. With the strip 30 not covered by cover 40 (i.e. the cover 40 in the disengaged position 60), the hook fastener material 32 of strip 30 is exposed and may be engaged with fabric covering 440 of cargo bay floor 410 of vehicle 400 to secure strip 30 and, thus, side 24 of fabric layer 20 to fabric covering 440 of vehicle 400.

Complementary strip 50 is disposed about side 46 of cover 40. Complementary strip 50 includes a loop material 52 and complementary strip generally conforms to strip 30 in size and shape, as illustrated. In some implementations, the loop material 52 of complementary strip 50 may be integral with the cover 40—i.e. the cover is formed, at least in part, of the loop material. In other implementations, the loop material 52 may be a separate piece of material attached to cover 40 by stitching, adhesive, or so forth, or otherwise incorporated into cover 40. The edges 42, 43, 44, 45 of cover 40 may extend beyond the edges 53, 54, 55, 56 of complementary strip 50, as illustrated, or edges 42, 43, 44, 45 of cover 40 may generally conform to the edges 53, 54, 55, 56 of complementary strip 50.

Figure 2B:
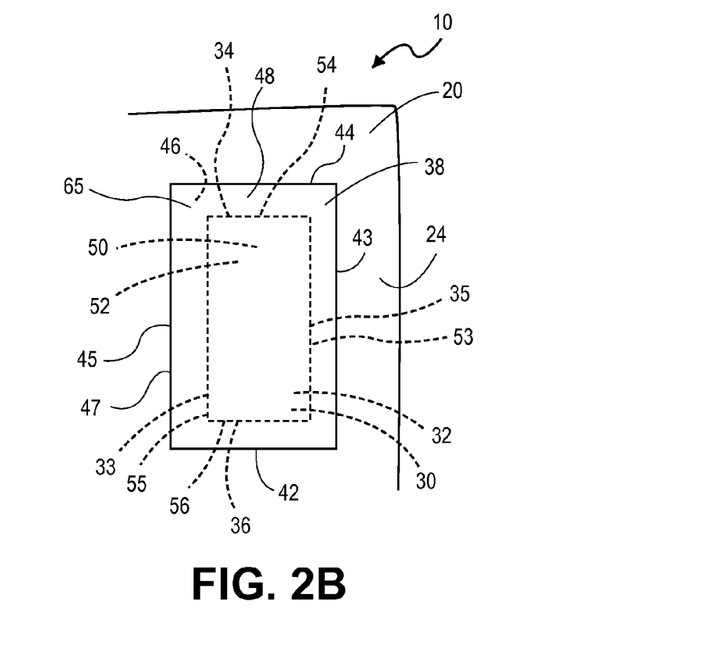
FIG. 2B illustrates by frontal view portions of the implementation of the utility blanket of FIG. 1A including the cover in an engaged position.

As illustrated in FIG. 2B, cover 40 is positioned in an engaged position 65 such that strip 30 is covered by cover 40 and loop material 52 of complementary strip 50 is engaged with hook fastener material 32 of strip 30 to hold cover 40 in the engaged position 65. With the cover 40 in the engaged position 65, sides 53, 54, 55, 56 of complementary strip 50 generally align with sides 35, 34, 33, 36, respectively, of strip 30 so that strip 30 is completely engaged with complementary strip 50. In other implementations, strip 30 may have other shapes such as square, circular, and so forth, and complementary strip may be correspondingly square shaped, circular shaped, and so forth such that the shape of the complementary strip 50 conform to the shape of the strip 30. With the strip 30 covered by cover 40, side 24 of fabric layer 20 and side 48 of cover 40 may be slid across fabric covering 440 of vehicle 400 without hook fastener material 32 engaging fabric covering 440. The side 48 of cover 40 may contact the fabric covering, while strip 30 is shielded from contact with fabric covering 440 by cover 40. Accordingly, with cover 40 positioned in the engaged position 65, the utility blanket 10 may be slid or otherwise positioned about the fabric covering 440 of vehicle 400 without the hook fastener material 32 of strip 30 engaging with the fabric covering 440.

When the utility blanket 10 is positioned about vehicle 400, the cover 40 may be positioned from the engaged position 65 into the disengaged position 60. With the cover 40 in the disengaged position 60, the hook fastener material 32 of strip 30 is exposed, so that the hook fastener material 32 of strip 30 may be engaged with fabric covering 440 to secure the strip 30 to the fabric covering 440. Thus, the utility blanket 10 may be secured to vehicle 400 by exposing the hook fastener material 32 of strip 30 and then engaging the exposed hook fastener material 32 of strip 30 with fabric covering 440.

Figure 3:
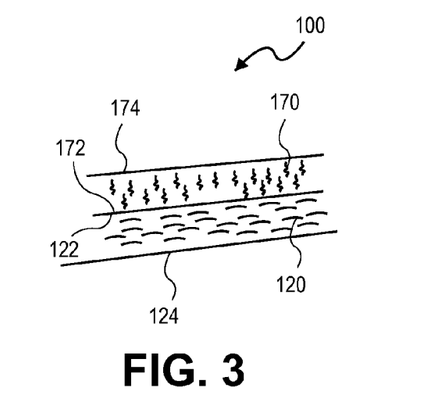
FIG. 3 illustrates by cut-away view an implementation of a utility blanket including a fabric layer and a complementary fabric layer.

FIG. 3 illustrates a portion of an implementation of a utility blanket 100 that includes multiple fabric layers. As illustrated in FIG. 3, utility blanket 100 includes fabric layer 120 with sides 122, 124, and complementary fabric layer 170 with sides 172, 174. With continuing reference to FIG. 3, fabric layer 120 is secured to complementary fabric layer 170 such that side 122 of fabric layer 120 is oriented toward side 172 of fabric layer 170. Fabric layer 120 may be secured to fabric layer 170 by stitching, adhesive, mechanical attachment, combinations thereof, and so forth, in various implementations. In the implementation of FIG. 3, side 124 of fabric layer 120 includes one or more strips, such as strip 30, and corresponding cover(s), such as cover 40 (see FIGS. 2A & 2B), to allow side 124 of fabric layer 120 to be secured to the fabric covering of a vehicle, such as fabric covering 440 of vehicle 400. Cargo, such as cargo 465, may be placed about side 174 of complementary fabric layer 170. In various implementations, fabric layer 120 may be formed from polyamide, polyvinyl, canvas, or other material. The material of fabric layer 120 may be woven or may be in the form of a sheet, and may be water repellent, chemically resistant, and may have other desirable properties. The material and construction of fabric layer 120 may be chosen such that side 124 slides readily over the fabric covering of the vehicle or to provide protection to the fabric covering of the vehicle or otherwise protect the vehicle. Complementary fabric layer 170 may be formed of various natural or synthetic generally compliant materials or combinations of materials. In various implementations, the complementary fabric layer 170 may be formed of materials that resist staining, resist wear, are liquid repellant, liquid absorptive, or that may cushion the cargo, protect the cargo, or protect the vehicle. In various implementations, the complementary fabric layer 170 may be formed of materials that are non-abrasive, fluffy, or have other properties that protect cargo positioned thereupon. Fabric layers 120, 170 may be formed of cloth or other textiles or compliant sheets of plastic (such as vinyl or rubber) or combinations thereof. Fabric layer 120 or complementary fabric layer 170 may be treated with various materials that, for example, confer stain resistance, repel insects, or repel water or other liquids. Fabric layer 120 or fabric layer 170 may include multiple layers of material and may include multiple materials in various implementations.

Figure 4A:
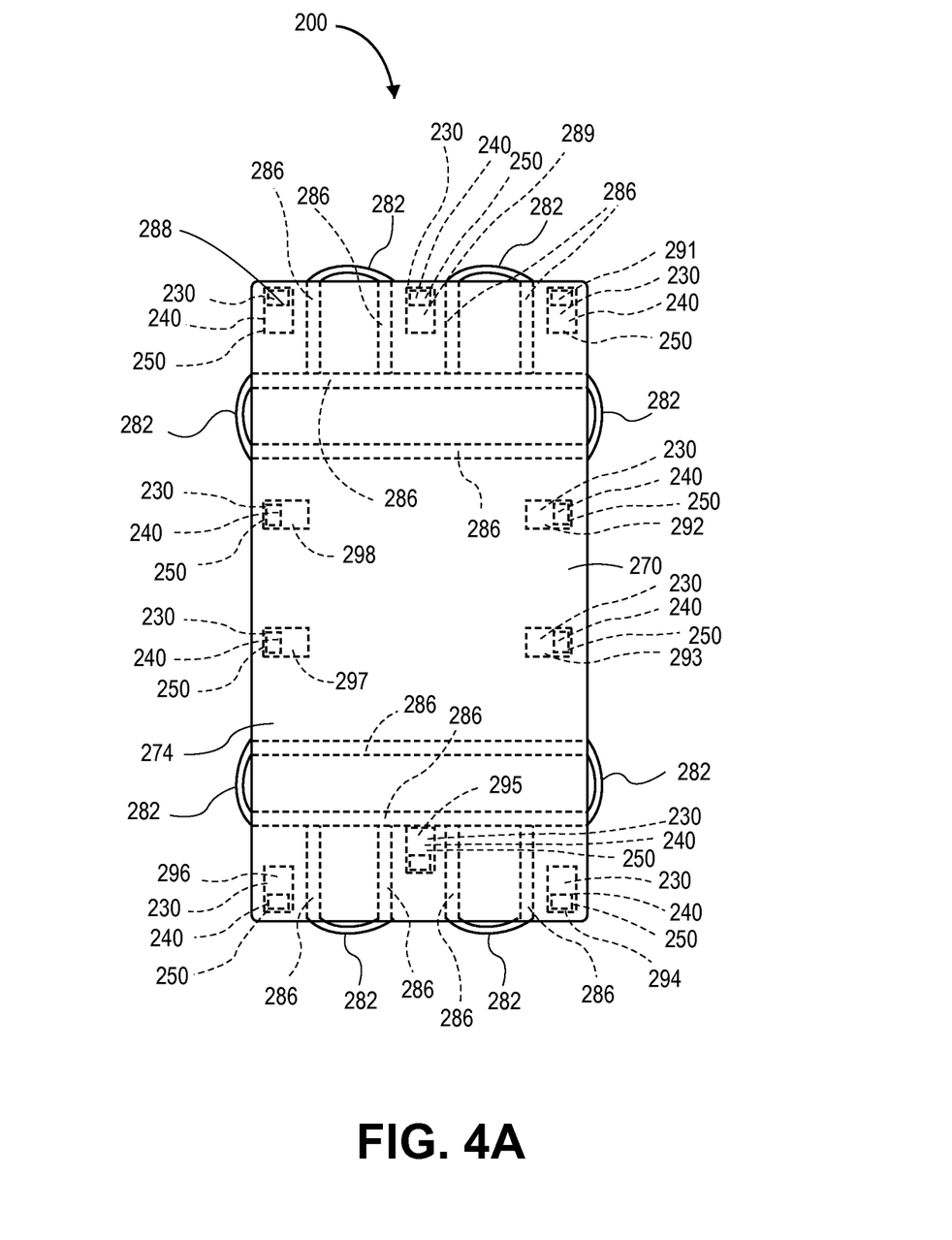
FIG. 4A illustrates by top view an implementation of a utility blanket.
Figure 4B:
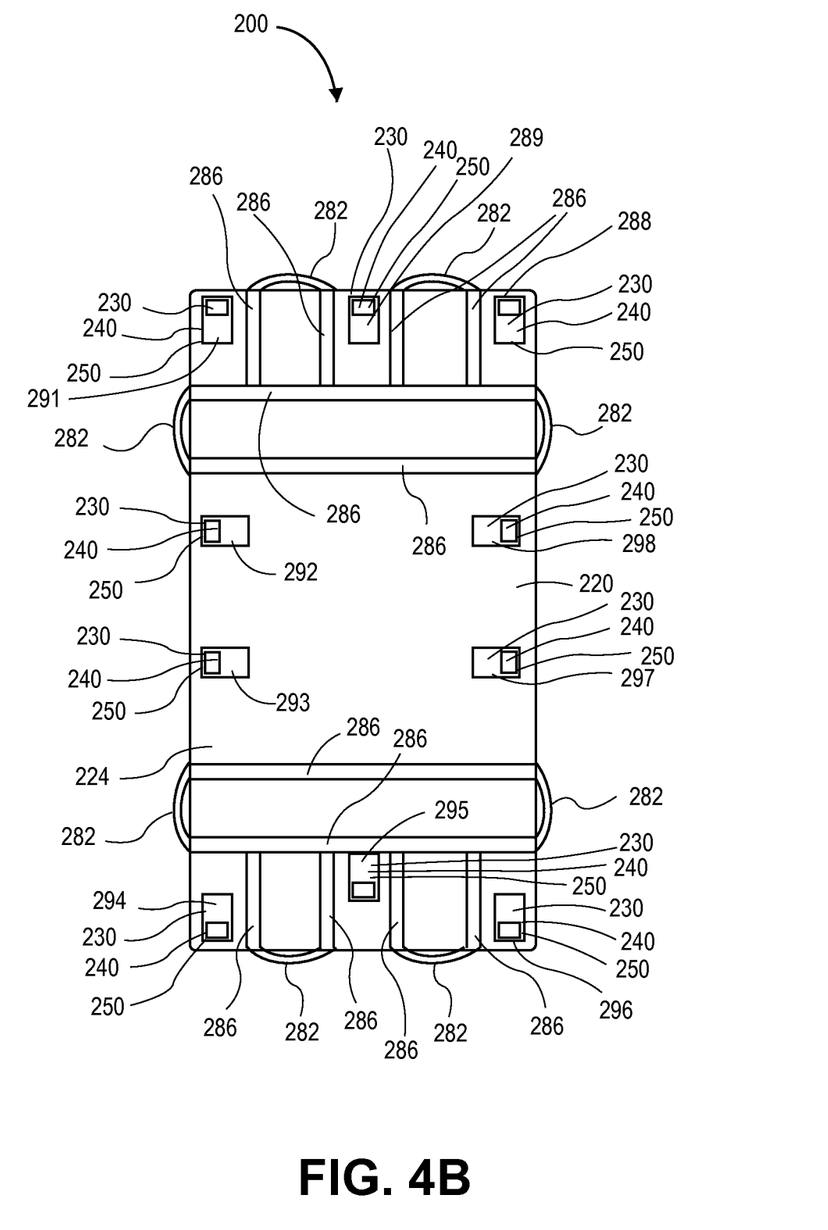
FIG. 4B illustrates by bottom view the implementation of the utility blanket of FIG. 4A.

FIGS. 4A and 4B illustrate an implementation of utility blanket 200. As illustrated in FIG. 4A, utility blanket 200 includes fabric layer 220 and complementary fabric layer 270. Cargo, such as cargo 465, may be placed upon surface 274 of complementary fabric layer 270. Handles 282 may be located about the perimeter of utility blanket 200 to allow the user to carry or maneuver the utility blanket 200, and cargo may be positioned upon utility blanket 200 as utility blanket 200 is being so carried or maneuvered. Handles 282 may be secured to reinforcement strips 286. Reinforcement strips 286 may pass about the fabric layer 220, the complementary fabric layer 270, or both. The reinforcement strips 286 may be secured to the fabric layer 220, the complementary fabric layer 270, or both by stitching, adhesive, mechanical attachment, etc., and combinations thereof to provide attachment for the handles 282 to the utility blanket 200 and to buttress the structure of the utility blanket 200. The utility blanket 200 is generally rectangular as shown, but may be square, circular, or assume other shapes in various other implementations.

Attachment points 288, 289, 291, 292, 293, 294, 295, 296, 297, 298 are disposed about surface 224 of fabric layer 220 of utility blanket 200, and the utility blanket 200 may be secured to the fabric covering 440 of vehicle 400 at the attachment points 288, 289, 291, 292, 293, 294, 295, 296, 297, 298. More or fewer attachment points may be included in various implementations, and the attachment points may be distributed about surface 224 of fabric layer 220 in various ways.

The utility blanket, such as utility blanket 200 may be sized, and the attachment points, such as attachment points 288, 289, 291, 292, 293, 294, 295, 296, 297, 298, chosen to conform to a specified vehicle, i.e. a specific make and model of vehicle. The utility blanket may be sized to fit the specified vehicle and the attachment points may be selected to align with locations in the specified vehicle and may so align in various ways dependent upon how the vehicle is configured. For example, the vehicle may be configured by placing the seats in an upright position or in a collapsed position, removing seats, shifting the position of the seats, configuring the cargo space in various ways, and so forth, and the attachment points may be selected to align with the fabric covering of the vehicle under these differing vehicle configurations.

In the implementation of FIGS. 4A and 4B, each of attachment points 288, 289, 291, 292, 293, 294, 295, 296, 297, 298 includes a strip 230 that includes a hook fastener material. The utility blanket 200 may be secured to fabric covering 440 by engagement of the hook fastener material of strips 230 at attachment points 288, 289, 291, 292, 293, 294, 295, 296, 297, 298 with the fabric covering 440. Attachment points 288, 289, 291, 292, 293, 294, 295, 296, 297, 298 include covers 240, and the covers 240 include strips 250 of loop material. The covers 240 are positionable between an engaged position and a disengaged position.

In the engaged position, the loop material of the cover 240 is engaged with the hook fastener material of the strip 230 such that the covers 240 cover the strips 230 at the attachment points 288, 289, 291, 292, 293, 294, 295, 296, 297, 298, so that, for example, the utility blanket may be slid across the fabric covering without the hook fastener material of the strips 230 at the attachment points 288, 289, 291, 292, 293, 294, 295, 296, 297, 298 engaging the fabric covering 440.

In the disengaged position, the covers 240 at attachment points 288, 289, 291, 292, 293, 294, 295, 296, 297, 298 are positioned to expose the hook fastener material of strips 230 to allow the hook fastener material of strips 230 to be engaged with the fabric covering 440 of the vehicle 400 in order to secure the utility blanket 200 to the vehicle 400 at the attachment points 288, 289, 291, 292, 293, 294, 295, 296, 297, 298.

Figure 4C:
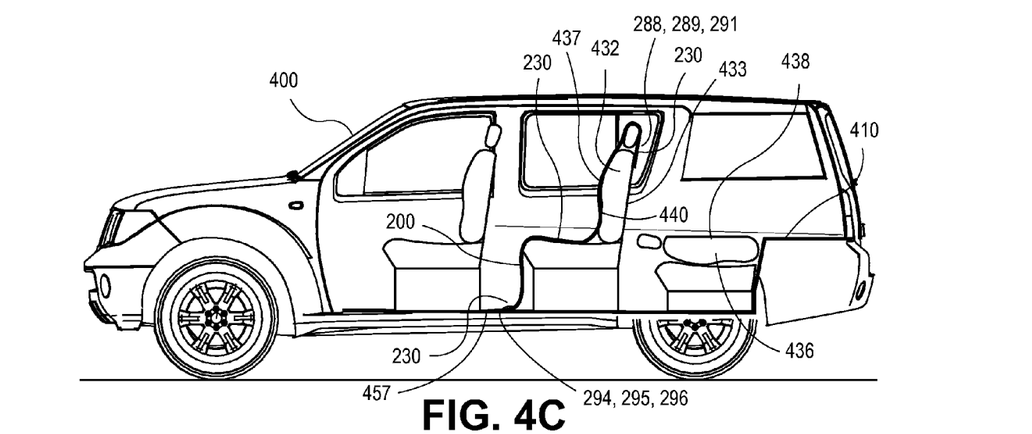
FIG. 4C illustrates by side view the implementation of the utility blanket of FIG. 4A and FIG. 4B positioned about seats within the vehicle.

FIG. 4C illustrates utility blanket 200 placed over portions of seats 432, 434 to cover those portions of seats 432, 434. As illustrated in FIG. 4C, strips 230 at some combination of attachment points, such as attachment points 288, 289, 291, are secured to seat back 433 of seat 432 and seat back 435 of seat 434 (see FIG. 1A) to secure utility blanket to seat backs 433, 435 of seats 432, 434, respectively, of vehicle 400. Portions of utility blanket 200 are draped over seat front 437 of seat 432 and the seat front (not shown) of seat 434 and some combination of attachment points, such as attachment points 292, 293, 294, 295, 296, 297, 298, may be secured to seat front 437 of seat 432 and the seat front of seat 434 or vehicle floor 457 to secure utility blanket 200 thereto. For example, as illustrated, attachment points 294, 295, 296 are secured to the vehicle floor 457. Attachment points 288, 289, 291, 292, 293, 294, 295, 296, 297, 298 may be located about utility blanket 200 to attach to pre-selected locations on seats 432, 434, vehicle floor 457, or both seats 432, 434 and vehicle floor 457.

Figure 4D:
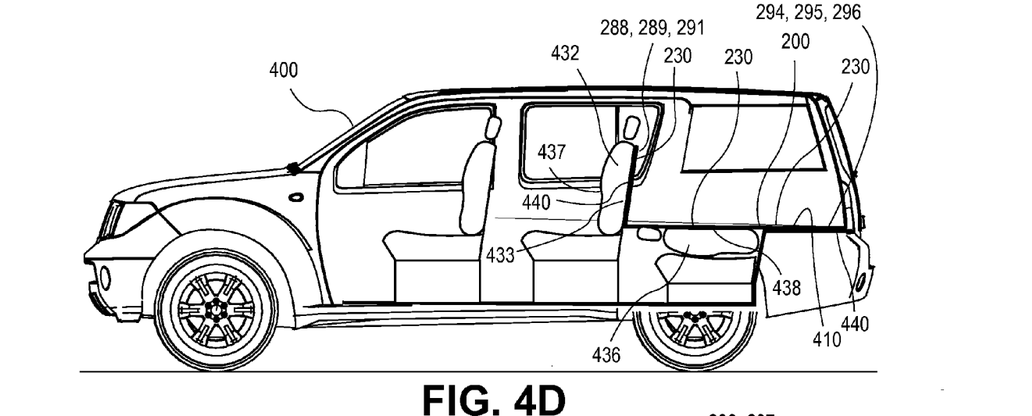
FIG. 4D illustrates by side view the implementation of the utility blanket of FIG. 4A and FIG. 4B positioned about seats within the vehicle and the cargo bay floor.

FIG. 4D illustrates utility blanket 200 placed over seat back 433 of seat 432, over seat back 435 of seat 434 (see FIG. 1A), and over portions of cargo bay floor 410 of vehicle 400. As illustrated, some combination of attachment points, such as attachment points 288, 289, 291, are secured to seat back 433 of seat 432 and seat back 435 of seat 434 to secure utility blanket to seat back 433 of seat 432 and seat back 435 of seat 434 of vehicle 400. Attachment point 298 may be secured to seat back 433 of seat 432 and attachment point 292 may be secured to seat back 435 of seat 434. Attachment points 292, 298 may be located such that attachment points 292, 298 attach to seat backs 435, 433, respectively, generally proximate cargo bay floor 410. Some combination of attachment points 293, 294, 295, 296, 297 may be secured to cargo bay floor 410 to secure utility blanket 200 to cargo bay floor 410 in this implementation. Attachment points 288, 289, 291, 292, 293, 294, 295, 296, 297, 298 may be located about utility blanket 200 to attach to pre-selection locations on seat backs 433, 435, 438, or other locations about cargo bay floor 410, in various implementations.

Figure 4E:
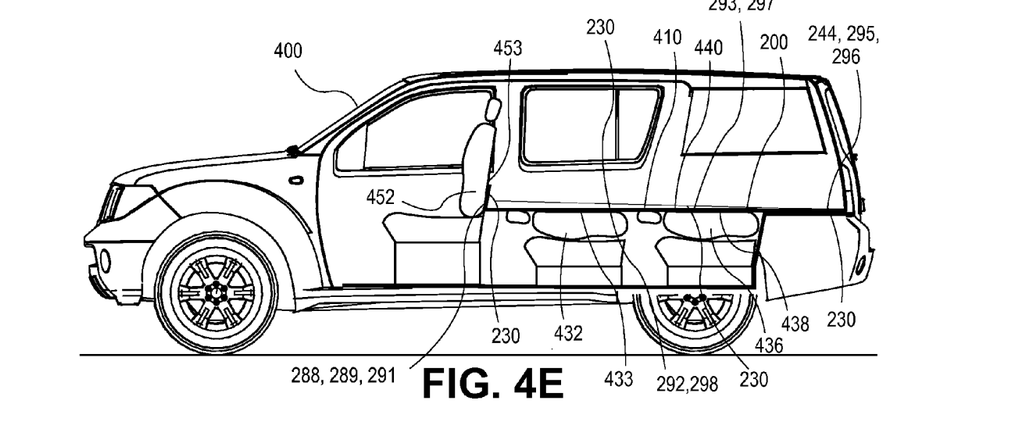
FIG. 4E illustrates by side view the implementation of the utility blanket of FIG. 4A and FIG. 4B positioned generally about the cargo bay floor; and, FIG. 5 illustrates by process flow chart an exemplary method of use of a utility blanket.

FIG. 4E illustrates utility blanket 200 secured to cargo bay floor 410 of vehicle 400. As illustrated in FIG. 4E, portions of cargo bay floor 410 are defined by seat backs 435, 433 of seats 434, 432, respectively, with seats 434, 432 placed in the folded position, and portions of cargo bay floor 410, are defined by the seat back 438 of seat 436 in the folded position. As illustrated in FIG. 4E, strips 230 at some combination of attachment points, such as attachment points 288, 289, 291, may be secured to seat back 453 of seat 452 and the seat back of the companion seat to seat 452 (seat in the same row—not included in this illustration) as seat 452 to secure utility blanket 200 thereto. The remaining attachment points 292, 293, 294, 295, 296, 297, 298 may be secured to cargo bay floor 410 of vehicle 400 to secure the utility blanket 200 to the cargo bay floor 410, as illustrated in FIG. 4E. Attachment points 288, 289, 291, 292, 293, 294, 295, 296, 297, 298 may be located about utility blanket 200 to attach to pre-selection locations on seats back 453 of seat 452 or the seat back of the companion seat to seat 452, or to attach to pre-selected locations about cargo bay floor 410 including pre-selected locations on seat backs 433, 435, 438, in various implementations. In various implementations, the attachment points, such as attachment points 288, 289, 291, 292, 293, 294, 295, 296, 297, 298, may be located about the utility blanket, such as utility blanket 200, to attach to pre-selection locations on or about a particular make and model of vehicle.

In operation, a utility blanket, such as utility blanket 10, 100, 200, may be positioned about a vehicle, such as vehicle 400, and cargo, such as cargo 465, may be placed upon the utility blanket. A user may grasp the utility blanket, which may have cargo placed thereupon, by handle(s), such as handles 82, 282, to maneuver the utility blanket into or out of the vehicle or to position the utility blanket about the vehicle. With the utility blanket positioned about the vehicle, covers, such as covers 40, 240, may be positioned from an engaged position, such as engaged position 60 into a disengaged position, such as disengaged position 65, to expose a strip, such as strip 30, 230 that includes a hook fastener material, such as hook fastener material 32. With the cover positioned in the disengaged position, the exposed hook fastener material of the strip may be engaged with fabric covering, such as fabric covering 440, of the vehicle to secure the utility blanket thereto. The user may apply pressure about the strip to engage the hook fastener material with the fabric covering. A plurality of strips may be provided about the utility blanket, and each strip of the plurality of strips may be secured to the fabric covering by engagement of the hook fastener material of the strip with the fabric covering.

In order to remove the utility blanket from the vehicle, the user may grasp the strip and may disengage the hook fastener material of the strip from the fabric covering by pulling the strip away from the fabric covering with force sufficient to release the hook fastener material from the fabric covering. The user may then position the cover from the disengaged position into the engaged position. In the engaged position, a complementary strip, such as complementary strip 50, 250, of loop material, such as loop material 52, located on the cover engages the hook fastener material of the strip thereby securing the cover over the strip in order to cover the strip. With the strip covered by the cover, the utility blanket may be slid about the fabric covering of the vehicle without the hook fastener material engaging with the fabric covering, so that the utility blanket may be slidably extracted from the vehicle or repositioned about the vehicle. Only the cover and not the strip may contact the fabric covering of the vehicle when the cover is in the engaged position. The utility blanket may be slid over the fabric covering in order to load the vehicle by slidably inserting the utility blanket onto the vehicle. The utility blanket may be slid about the vehicle in order to reposition the utility blanket on the vehicle. The utility blanket may be removed from the vehicle by sliding the utility blanket over the fabric covering. The material of which the fabric layer, such as fabric layer 20, 120, 220, is formed may be selected to facilitate the sliding of the utility blanket over the fabric covering with cargo placed upon the utility blanket.

Figure 5:
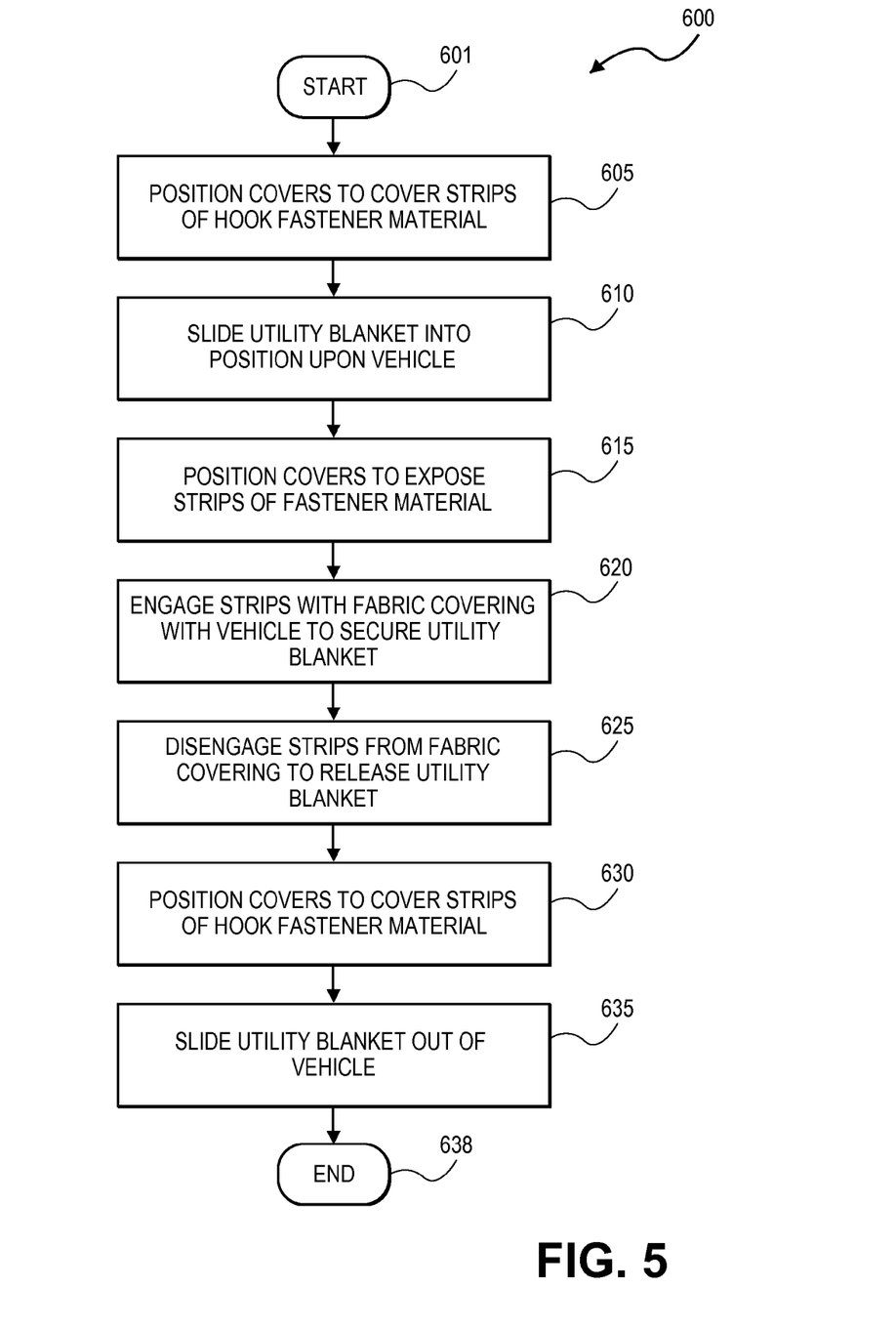

An exemplary operational method 600 of a utility blanket is illustrated by process flow chart in FIG. 5. Method 600 may be entered at step 601. At step 605, covers are positioned to cover strips of hook fastener material located about the utility blanket. With the covers so positioned, the utility blanket may be slid into position over fabric covering of a vehicle at step 610. The covers may contact the fabric covering as the utility blanket is slid into position, and the covers prevent engagement of the hook fastener material of the strips with the fabric covering. Cargo may be positioned upon the utility blanket as the utility blanket is positioned about the vehicle, and one or more handles secured to the utility blanket may be used to manipulate the utility blanket into position. With the utility blanket generally in position, the covers may be removed from the strips of hook fastener material at step 615 to expose the strips of hook fastener material. At step 620 the strips of hook fastener material are engaged with the fabric covering of the vehicle to secure the utility blanket to the vehicle.

At step 625, the hook fastener material of the strips is disengaged with the fabric covering. At step 630 the covers are positioned to cover the strips of hook fastener material to prevent engagement of the hook fastener material of the strips with the fabric covering. At step 635 the utility blanket is slid out of the vehicle. Cargo may be positioned upon the utility blanket as the utility blanket is slid forth from the vehicle. One or more handles secured to the utility blanket may be used to grasp the utility blanket as the utility blanket is slid forth from the vehicle. The exemplary method 600 terminates at step 638.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A portable utility blanket for use in the cargo area of a vehicle, wherein the cargo area has a fabric covering, said utility blanket comprising:
   a) a fabric material having a first side, a second side, and four edges that form the perimeter of said fabric material;
   b) a plurality of handles formed along each of said four edges of said fabric material; and
   c) a plurality of attachment points secured to said second side of said fabric material adjacent each of said four edges of said fabric material, wherein each of said attachment points comprises hook fastener material affixed to said second side of said fabric material, a cover hingedly affixed to said second side of said fabric material adjacent said hook fastener material, and loop fastener material affixed to said cover;
   d) wherein said cover is operable to pivot said loop fastener material into engagement with said hook fastener material to cover said hook fastener material so that said utility blanket can be slid about the cargo area of the vehicle without said hook fastener material engaging the fabric covering in the cargo area;
   e) wherein said cover is further operable to pivot said loop fastener material out of engagement with said hook fastener material to uncover said hook fastener material so that said hook fastener material will engage the fabric covering in the cargo area of the vehicle and thereby prevent said utility blanket from sliding about the cargo area.

2. The utility blanket according to claim 1, further comprising a plurality of reinforcement strips secured to said fabric material to buttress said utility blanket.

3. A portable utility blanket for use in the cargo area of a vehicle, wherein the cargo area has a fabric covering, said utility blanket comprising:
   a) a rectangular fabric material having a first side, a second side, and four edges that form the perimeter of said fabric material;
   b) two handles formed along each of said four edges of said fabric material;
   c) a plurality of reinforcement strips secured to said fabric material to buttress said utility blanket; and
   d) a plurality of attachment points secured to said second side of said fabric material adjacent each of said four edges of said fabric material, wherein each of said attachment points comprises hook fastener material affixed to said second side of said fabric material, a cover hingedly affixed to said second side of said fabric material adjacent said hook fastener material, and loop fastener material affixed to said cover;
   e) wherein said cover is operable to pivot said loop fastener material into engagement with said hook fastener material to cover said hook fastener material so that said utility blanket can be slid about the cargo area of the vehicle without said hook fastener material engaging the fabric covering in the cargo area;
   f) wherein said cover is further operable to pivot said loop fastener material out of engagement with said hook fastener material to uncover said hook fastener material so that said hook fastener material will engage the fabric covering in the cargo area of the vehicle and thereby prevent said utility blanket from sliding about the cargo area.

4. A method of securing a portable utility blanket to fabric covering in the cargo area of a vehicle, wherein said utility blanket comprises a fabric material having a first side, a second side, and four edges that form the perimeter of said fabric material, a plurality of handles formed along each of said four edges of said fabric material, and a plurality of attachment points secured to said second side of said fabric material adjacent each of said four edges of said fabric material wherein each of said attachment points comprises hook fastener material affixed to said second side of said fabric material, a cover hingedly affixed to said second side of said fabric material adjacent said hook fastener material, and loop fastener material affixed to said cover, said method comprising the steps of:
   1) engaging said loop fastener material with said hook fastener material to cover said hook fastener material;
   2) inserting said utility blanket into said cargo area of said vehicle such that said second side of said fabric material is in contact with said fabric covering in said cargo area;
   3) disengaging said loop fastener material from said hook fastener material to uncover said hook fastener material; and
   4) engaging said hook fastener material with said fabric covering in said cargo area to prevent said utility blanket from sliding about said cargo area.

5. The method according to claim 4, wherein said utility blanket further comprises a plurality of reinforcement strips secured to said fabric material to buttress said utility blanket.

* * * * *